United States Patent [19]

Lombard

[11] Patent Number: 5,388,546
[45] Date of Patent: Feb. 14, 1995

[54] AUTOMOBILE LOCATOR DEVICE

[76] Inventor: Claude H. Lombard, P.O. Box 561, Lincoln, Me. 04457

[21] Appl. No.: 129,349

[22] Filed: Sep. 30, 1993

[51] Int. Cl.$^6$ .................. G09F 17/00; G09F 21/04; B60Q 7/00
[52] U.S. Cl. .................. 116/209; 116/28 R; 116/173; 40/592; 40/600
[58] Field of Search .................. 116/63 P, 209, 28 R, 116/123, 174; 40/592, 600, 591

[56] References Cited

U.S. PATENT DOCUMENTS

| | | | |
|---|---|---|---|
| 2,101,163 | 12/1937 | Wolfe | 116/173 |
| 3,127,869 | 4/1964 | Howland | 116/173 |
| 3,148,856 | 9/1964 | Orlando | 116/173 |
| 3,241,516 | 3/1966 | Hopkins | 116/173 |
| 3,507,245 | 4/1970 | Grabow | 40/592 X |
| 4,144,833 | 3/1979 | Newman, Sr. | 116/63 P X |
| 4,158,925 | 6/1979 | Gagnon | 40/591 |
| 4,574,726 | 3/1986 | Sullivan | 116/28 R |
| 4,700,655 | 10/1987 | Kirby | 116/174 |
| 4,751,494 | 6/1988 | Crotwell | 40/592 X |
| 4,964,360 | 10/1990 | Henry | 116/28 R |
| 5,076,196 | 12/1991 | Chan | 116/28 R |

FOREIGN PATENT DOCUMENTS 1444465  7/1976  United Kingdom .................. 40/591

OTHER PUBLICATIONS

EPO Publication No. 0352386 published Jan. 31, 1990, "Foldable Warning Distress Sign".

Primary Examiner—William A. Cuchlinski, Jr.
Assistant Examiner—Willie Morris Worth
Attorney, Agent, or Firm—Frederick R. Cantor

[57] ABSTRACT

A device is removably mounted on the exterior roof surface of an automotive vehicle, for locating the vehicle while parked in a crowded parking lot. The locator device comprises a magnetic base attachable to the vehicle roof, a mast extending upwardly from the base, and a pennant extending laterally from the mast. The pennant is preferably formed of a stiff plastic sheet, so as to have a large surface area presented for viewing by the motorist when he returns to the parking lot seeking his vehicle. The magnetic base has three hundred sixty (360) degree adjustability around the mast axis, so that the stiff plastic sheet can face in any desired compass direction.

1 Claim, 1 Drawing Sheet

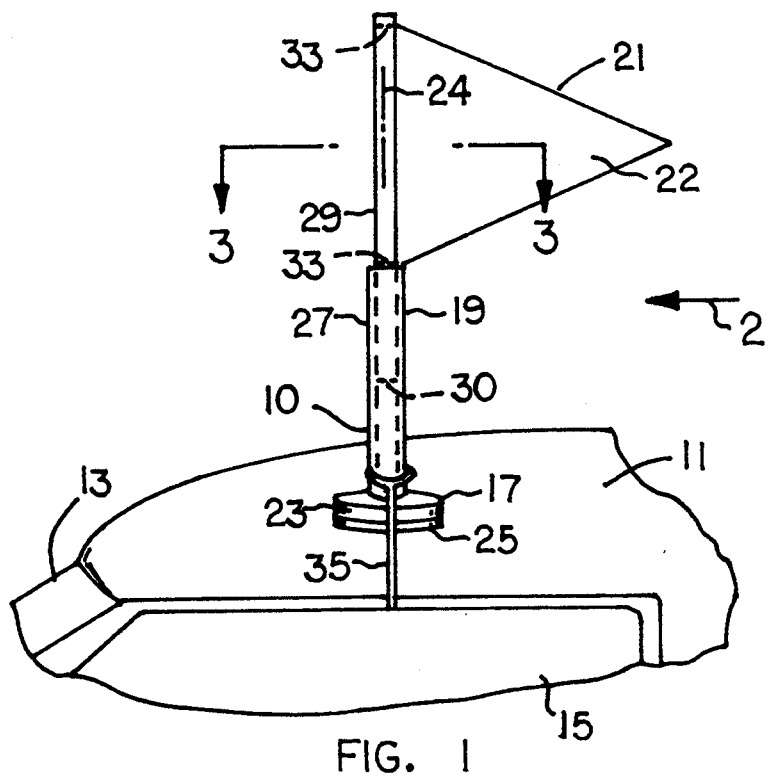
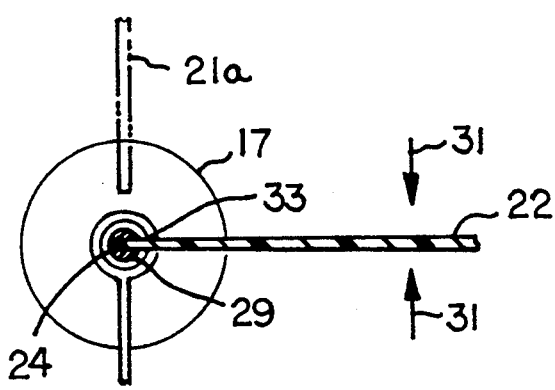
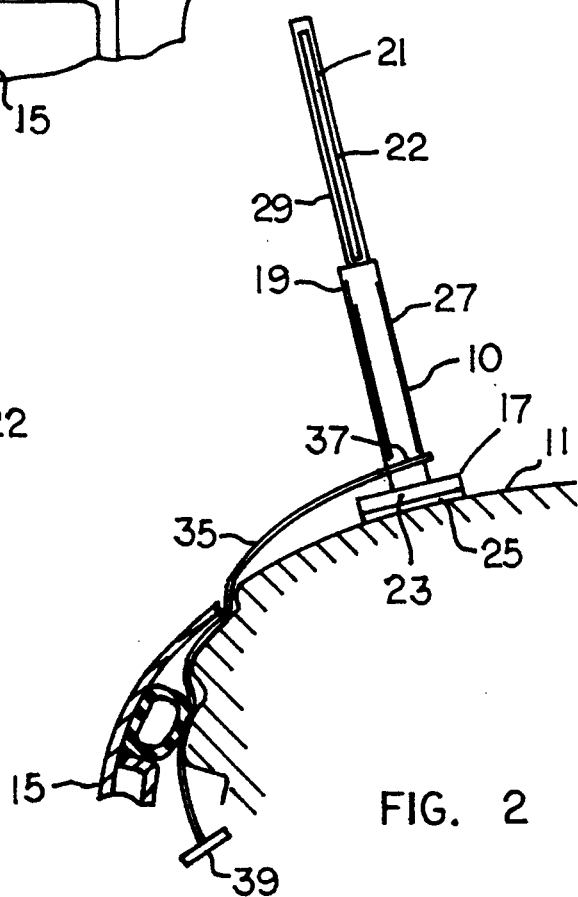
FIG. 1
FIG. 3
FIG. 2

AUTOMOBILE LOCATOR DEVICE

BACKGROUND OF THE PRESENT INVENTION

The present invention relates to locator devices.

The present invention, more particularly, relates to a locator device for an automobile.

The locator device comprises a magnetic base releasably attachable to the roof surface of an automobile, a mast extending upwardly from said base, and a colored pennant extending laterally from said mast. When the locator device is placed on the roof of an automobile in a large parking lot or garage, crowded with automobiles, the colored pennant is visible to the automobile owner, while the owner is at an appreciable distance from the automobile. The locator device thus saves the motorist, i.e. owner, time that might otherwise be spent hunting for the automobile.

Carl Dexter U.S. Pat. No. 3,540,406, issued on Nov. 17, 1970, discloses a vehicle locator device, that includes a base adhesively attached to the exterior roof surface of an automotive vehicle, a connector member pivotably mounted on the base, and a cylindrical mast attachment member pivotably attached to said connector member. The multiple pivot connections enable the mast to be adjusted between a prone, or inactive, position lying against the automobile roof surface, and an upstanding, or active, position projecting generally vertically upwardly from the roof surface. A flag is attached to the upper end of the mast to provide an indication of the vehicle location when the vehicle is parked in a crowded parking lot.

One disadvantage of the locator device shown in the Dexter U.S. Pat. No. 3,540,406, is that when the mast is in the prone position, it is likely to rattle against the roof surface, especially when the vehicle is moving on rough roads or through light winds; the pivotal connections would promote rattling.

Another disadvantage of the device shown in Dexter U.S. Pat. No. 3,540,406, is that the device is adhesively attached to the roof surface. Over time, the adhesive connection would tend to mar the finish on the roof surface. Also, the device is conspicuous in the prone position; some motorists might consider the device to detract from the appearance of the vehicle. Further, while the vehicle is moving, with the device in the prone position, the flag would very likely flap back and forth in the vehicle windstream, thereby creating an annoying flapping sound.

A further disadvantage of the device shown in the Dexter Patent is that when the mast is in its active, or upstanding position, the flag may not be readily visible to the motorist located far away from the vehicle. A flag, formed of a flexible cloth material, would tend to hang downwardly alongside the mast, so as to be relatively inconspicuous when viewed from points far away from the vehicle.

A further problem with the Dexter Patented Device is that the various pivotable connections are formed by screws that require screw driver adjustment to achieve a desired friction drag. Most motorists would not want to keep a screw driver on hand for adjustment purposes.

SUMMARY OF THE PRESENT INVENTION

An object of the present invention is to provide a locator device.

A further object of the present invention is to provide a locator device for an automobile.

The present invention relates to a vehicle locator device that comprises a magnetic base adapted to be placed on the exterior roof surface of an automobile, a mast extending upwardly from the base, and a colored pennant extending laterally from the mast. The pennant is formed out of a stiff plastic sheet material so that it extends outwardly, away from the mast, without drooping or hanging downwardly, as would be the case with a flag formed of a flexible cloth material.

The magnetic base is completely separable from the vehicle, such that the base can have any desired orientation on the vehicle roof surface. In effect, the base has three hundred sixty (360) degree adjustability on the roof surface, so that the stiff plastic sheet, i.e. pennant can face in any compass direction. The motorist can orient the device on the vehicle so that when he comes out of the store, or arena, bordering the parking lot, the colored pennant will have its flat major surface facing the motorist. The motorist can therefore readily locate the vehicle, since he will have a good, full face, view of the pennant, and not an edge view.

When the locator device is not being used, it can be completely removed from the vehicle and stored in the vehicle trunk. During normal operation of the vehicle the locator device is hidden away in the trunk, or on the back seat of the car, where it will not detract from the vehicle's appearance, or produce any rattling sounds, such as might be produced with the device shown in the Dexter Patent.

In summary, and in accordance with the above discussion, the foregoing objectives are achieved in the following embodiments:

1. An automobile locator device, adapted for placement on the roof of an automobile, comprising:
   a mast having a longitudinal axis, an upper end, and a lower end;
   a magnetic base attached to the lower end of said mast;
   said base comprising a permanent magnet having a bottom face, and a resilient pad secured to the magnet bottom face, whereby the pad protects an automobile roof surface against damage when the base is positioned thereon;
   a pennant extending laterally from said mast a significant distance above the base, whereby the pennant is visible above the roof of an automobile on which the locator device is installed;
   said pennant comprising a stiff plastic sheet coplanar with the mast longitudinal axis; and
   said base having three hundred sixty (360) degree adjustability around the mast axis, so that the stiff plastic sheet can face in any compass direction.

2. The automobile locator device, as described in paragraph 1, wherein said mast has a slot extending along the mast axis; and said stiff plastic sheet having an edge area thereof extending into said slot, whereby the plastic sheet has a firm strong connection to the mast.

3. The automobile locator device, as described in paragraph 1, wherein said mast comprises, a tube extending upwardly from the magnetic base, and a rod having a lower end portion telescopically extending within said tube;
   said rod having an upper end constituting the upper end of the mast;

said rod having a slot extending longitudinally therealong from a point near the rod upper end to the point where the rod emerges from said tube; and said stiff plastic sheet having an edge area thereof extending into said slot for firmly attaching the sheet to the mast.

4. The automobile locator device, as described in paragraph 1, wherein said magnetic base has a circular shape in the top plan direction.

5. The automobile locator device, as described in paragraph 1, wherein said stiff plastic sheet has a triangular shape.

6. The automobile locator device, as described in paragraph 1, wherein said stiff plastic sheet has a fluorescent coloration, whereby the pennant remains visible under poor visibility condition.

7. The automobile locator device, as described in paragraph 1, and further comprising a flexible cord having a loop portion loosely encircling the mast, and an enlarged end portion remote from the loop portion; and said flexible cord being of such a length as to be extendable into the space between an edge of an automobile door and the door jamb area, when the door is in its closed position, whereby the locator device is retained against unauthorized removal from the automobile.

BRIEF DESCRIPTION OF THE DRAWINGS OF THE PRESENT INVENTION

FIG. 1, is an elevational view of an automobile locator device, constructed according to the present invention.

FIG. 2, is a right end view of the FIG. 1 device, taken in the direction of arrow 2 in FIG. 1.

FIG. 3, is an enlarged sectional view taken on line 3—3 in FIG. 1.

DESCRIPTION OF THE PREFERRED EMBODIMENT OF THE PRESENT INVENTION

FIG. 1, is an elevational view of an automobile locator device, constructed according to the present invention.

The drawings show an automobile locator device 10, adapted for placement on the exterior roof surface 11, of a conventional automobile. As shown in FIG. 1, the automobile has a front windshield 13, and a front side door 15. The automobile locator device 10, is placed on the automobile roof surface 11, above the side door 15.

Locator device 10, further comprises a circular magnetic base 17, an elongated mast 19 extending upwardly from the base 17, and a colored pennant 21, extending laterally from the mast 19, an appreciable distance above the magnetic base 17. Mast 19, will typically have a vertical length of about fifteen (15) inches. Pennant 21, has a triangular shape, with the vertical edge of the triangle measuring about eight (8) inches, and each of the other triangle edges measuring about ten (10) inches.

Referring now particularly to mast 19, the mast 19, comprises a permanent magnet 23, having a circular plan configuration, as viewed in FIG. 3. A thin resilient elastomeric pad 25, is adhesively attached to the bottom face of the magnet 23, so as to protect the surface of the automobile from damage when the locator device 10, is placed on the vehicle roof surface 11. The magnet 23, has sufficient magnetic strength to retain the locator device 10, on the automobile, when the vehicle is stationary.

Mast 19, comprises a plastic tube 27, extending upwardly from base 17, and a rod 29, having a lower end portion telescopically extended into the tube 27. Numeral 30, references the lower end of rod 29. The rod 29, is adhesively secured to tube 27, so that the rod 29, and tube 27, collectively form a relatively rigid mast structure. Tube 27, provides strength where the stress is greatest. Rod 29, is designed for achievement of a good, i.e. strong, connection with pennant 21.

Pennant 21, is formed out of a stiff plastic sheet 22, whereby the pennant 21, extends laterally straight out from the mast 19. The plastic sheet 22, is generally coplanar with the mast longitudinal axis 24. A person viewing the pennant 21, in a direction normal to the plane of the plastic sheet 22, will see the entire pennant 21, clearly and unmistakably. This feature enhances the visibility of the pennant 21, from remote areas, i.e. from places far away from the vehicle.

FIG. 2, is a right end view of the FIG. 1 device, taken in the direction of arrow 2 in FIG. 1.

FIG. 3, is an enlarged sectional view taken on line 3—3 in FIG. 1.

In FIG. 3, the preferred viewing direction or sight line, is indicated by arrow 31. The stiff nature of the plastic sheet 22, is advantageous, in that the entire sheet is visible, since the sheet does not hang down, or fold, against the mast 19, as would be the case with a pennant, or flag, formed of a flexible cloth material.

Rod 29, has a longitudinal slot 33, extending from a point near its upper end, to the point where the rod emerges from tube 27. A vertical edge area of plastic sheet 22, extends into slot 33. An adhesive connection is formed between the slot 33 surface, and the sheet 22 surfaces, whereby a strong firm connection is established between the rod 29, and the plastic sheet 22. As shown in FIG. 3, slot 33, extends through the diameter of rod 29, to provide an extensive slot surface area, in contact with the plastic sheet 22.

The circular shape of the magnetic base 17, is advantageous, in that the base 17, can have any desired orientation on the vehicle roof surface 11, without losing magnetic contact with the curved roof contour. Additionally, the base 17 has no corners. Base 17 can be positioned so that plastic sheet 22, of the pennant 21, faces in any desired direction of the compass. As shown in full lines in FIG. 3, the plastic sheet 22, extends in an east-west direction, whereby the sheet has maximum viewability in a north-south line of sight. In FIG. 3, numeral 21a, shows the pennant 21, oriented in a north-south direction for maximum viewability of the pennant 21, in the east-west direction.

In actual use of the locator device 10, the motorist would initially orient the device 10, so that pennant 21, is viewable from the point where the motorist re-enters the parking lot, e.g., the store entrance, or arena exit point. That point can be in any direction from the vehicle, depending on where the vehicle is parked. The use of the circular magnetic base structure 17, for attaching the locator device 10, to an automobile, gives the base 17, a three hundred sixty (360) degree adjustability around the mast axis 24, whereby the device 10, can be oriented with plastic sheet 22, facing in any compass direction. Both faces of plastic sheet 22, are preferably colored with a florescent coloring media, whereby the pennant 21, remains visible under poor visibility conditions, e.g., at dusk, or under dark, cloudy conditions.

In order to prevent unauthorized removal of the locator device 10, from the vehicle, while the motorist is away, e.g. shopping or attending a sporting event, there is provided a flexible cord 35, formed with a loop portion 37, loosely encircling mast 19. The opposite end of the cord 35, has an enlargement 39, that serves to prevent the cord from being pulled away from the automobile. FIG. 2, shows cord 35, extending within, or through, a crack formed between an edge of the automobile door 15, and the door jamb area on the automobile body. When the door 15, is initially closed on the cord 35, as shown in FIG. 2, the enlargement 39, on the cord 35, prevents the cord 35, from being pulled out of the door-jamb interface.

Cord 35, represents a relatively low cost device for preventing unauthorized removal of the locator device from the automobile, while still enabling the motorist to readily remove the device when he returns to the vehicle, i.e., by opening the vehicle door. The present invention is concerned primarily with the structural configuration of the removable automobile locator device, whereby the pennant is easily viewed from a range of different directions, as previously discussed.

The present invention describes an automobile locator device. Features of the present invention are recited in the appended claims. The drawings contained herein, necessarily depict specific structural features and embodiments of the automobile locator device, useful in the practice of the present invention.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. An automobile locator device adapted for placement on the roof of an automobile comprising:

a mast having a longitudinal axis, an upper end, and a lower end;

a magnetic base rigidly attached to the lower end of said mast;

said base comprising a permanent magnet having a bottom face, and a resilient pad secured to the magnet bottom face, whereby the pad protects an automobile roof surface against damage when the base is positioned thereon;

a pennant extending laterally from said mast a significant distance above the base, whereby the pennant is visible above the roof of an automobile on which the locator device is installed;

said pennant comprising a stiff plastic sheet having one edge thereof attached to said mast so that said one edge extends along the mast, with said plastic sheet extending in a radial plane originating at the mast longitudinal axis;

said resilient pad being matable to an automobile roof surface so that the magnetic base can have various different orientations on the roof surface, for enabling said stiff plastic sheet to face in any compass direction;

a flexible cord having a loop portion loosely encircling said mast, and an enlarged end portion remote from the loop portion; and said flexible cord being of such a length as to be extendable into the space between an edge of an automobile door and the door jamb area when the door is in its closed position, whereby the locator device is retained against unauthorized removal from the automobile.

* * * * *